Nov. 4, 1958             W. DOBLE            2,858,920
SPRING OPERATED CLUTCH
Filed Oct. 1, 1956
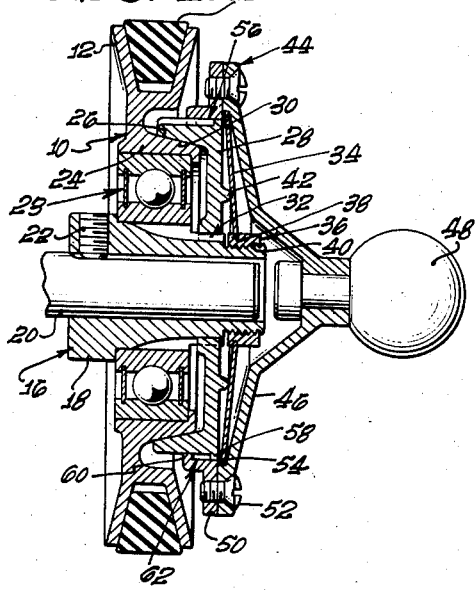
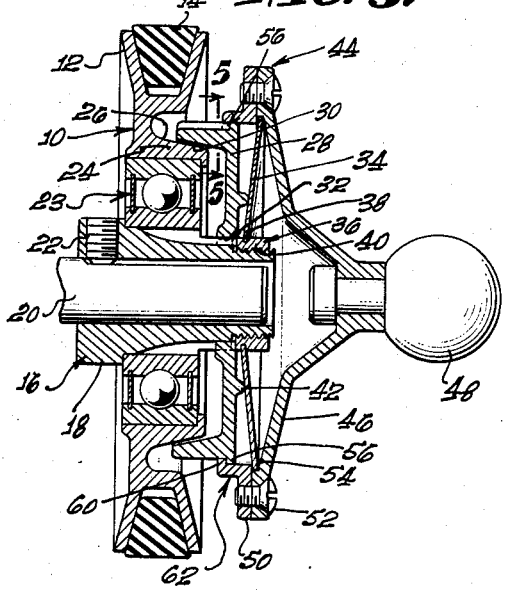
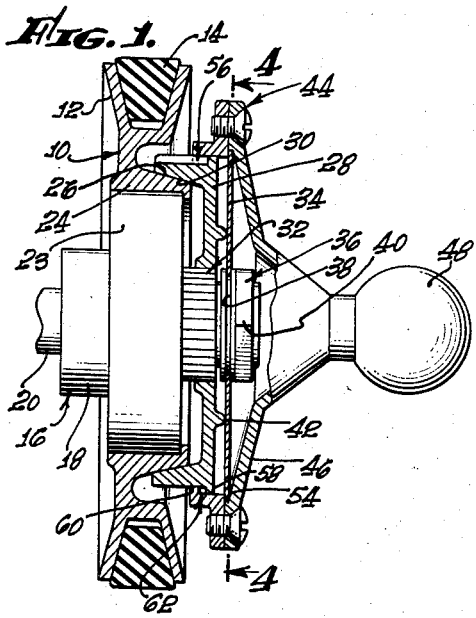
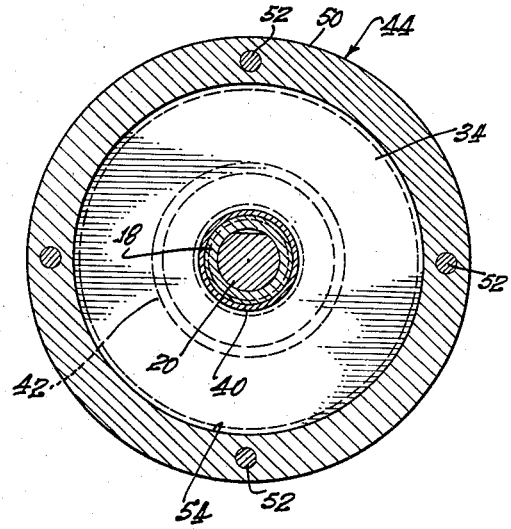
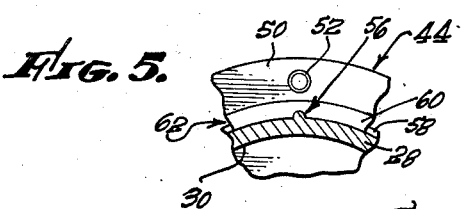
WARREN DOBLE,
INVENTOR.
BY HIS ATTORNEYS
HARRIS, KIECH, FOSTER & HARRIS.

United States Patent Office 2,858,920
Patented Nov. 4, 1958

2,858,920

SPRING OPERATED CLUTCH

Warren Doble, North Hollywood, Calif., assignor to Jabsco Pump Company, Burbank, Calif., a corporation of California Application October 1, 1956, Serial No. 613,016

11 Claims. (Cl. 192—89)

The present invention relates to a clutch for connecting a load to and disconnecting it from a continuously-operating prime mover as desired, a primary object of the invention being to provide a clutch for this purpose which is simple and inexpensive, yet positive in its action.

Generally speaking, the invention contemplates a clutch which includes driving and driven members rotatable about a common axis and respectively including driving and driven clutch elements, one of these clutch elements, e. g., the driven clutch element, being axially movable into and out of torque-transmitting engagement with the other clutch element. The invention also contemplates a clutch including annular, conical spring means capable of snapping over center between relatively inverted, clutch-engaging and clutch-disengaging positions through an intermediate, on-center position for biasing the movable clutch element into engagement with the other clutch element when the spring means is in the clutch-engaging position and for biasing the movable clutch element out of engagement with the other clutch element when the spring means is in the clutch-disengaging position, such a spring means being commonly known as a Belleville washer or spring.

Clutches incorporating Belleville springs are generally old, but it is an important object of the present invention to provide an improved clutch of this type which is simple and compact, inexpensive to manufacture, positive in its action, capable of being engaged and disengaged upon application of a small actuating force while still transmitting large torques, and the parts of which are constrained against relative movement by the Belleville spring when the clutch is engaged and disengaged so as to prevent rattling and wear due thereto.

More particularly, it is an object of the present invention to provide a clutch wherein the inner periphery of the Belleville spring engages a fulcrum means, wherein the outer periphery of the Belleville spring engages an axially movable actuating means for flexing the spring between its clutch-engaging and clutch-disengaging positions about the fulcrum means, and wherein the spring engages the movable clutch element in an annular zone intermediate the inner and outer peripheries of, and adjacent the inner periphery of, the spring. By locating the annular zone of engagement between the Belleville spring and the movable clutch element adjacent the fulcrumed inner periphery of the spring and by applying the actuating force to the outer periphery thereof, the clutch may be engaged and disengaged with small actuating forces, such manual forces being directly applied to the actuating means in the axial direction, which is an important feature of the invention.

Another object of the invention is to provide a clutch wherein the actuating means and the movable clutch element are axially slidable relative to each other, and to provide a clutch having a lost-motion connection between the actuating means and the movable clutch element, the lost motion provided by such connection being taken up as the actuating means is moved axially in a direction to move the Belleville spring from its clutch-engaging position toward its clutch-disengaging position and after the spring has been moved past its on-center position, whereby the energy liberated by the spring in snapping from the on-center position into the clutch-disengaging position is converted into an impact force applied to the movable clutch element to move this clutch element axially out of torque-transmitting engagement with the other clutch element in a positive manner, which is an important feature of the invention.

A further object of the invention is to provide a clutch wherein the Belleville spring engages the fulcrum means, the actuating means and the movable clutch element, in both the engaged and disengaged positions of the movable clutch element, in such a way as to constrain these parts against relative movement, thereby preventing rattling and wear due thereto, which is an important feature.

Another object is to provide a fulcrum means having the form of a fulcrum element threadedly mounted on the member, e. g., the driven member, carrying the movable clutch element so as to be axially movable relative to such member to provide for axial adjustment of the fulcrum of the Belleville spring. With this construction, the axial position of the fulcrum may be adjusted readily to preset the various parts properly before the clutch is placed in operation initially, or to reset the various parts to compensate for wear of the clutching surfaces of the two clutch elements after the clutch has been in use for some time.

Another object is to provide a clutch wherein the inner and outer peripheries of the Belleville spring merely loosely engage the fulcrum means and the actuating means respectively, and wherein the spring merely loosely engages the movable clutch element in an annular zone adjacent the inner periphery of the spring, while still providing the aforementioned constraint against relative movement both when the movable clutch element is in engagement with, and out of engagement with, the other clutch element. By providing such loose engagement between the Belleville spring, the fulcrum means, the actuating means and the movable clutch element, assembly of the various parts is greatly facilitated, which is an important feature.

Another object is to provide an actuating means having the form of a cover enclosing one end of the clutch, this cover being provided with a central knob for actuation of the clutch. A related object is to provide an actuating means wherein the outer periphery of the Belleville spring is loosely disposed between the cover and an annulus connected thereto, this annulus and the movable clutch element having thereon elements interengageable in response to axial movement of the actuating means relative to the movable clutch element to provide the lost-motion connection between the actuating means and the movable clutch element mentioned earlier herein.

The foregoing objects, advantages, features and results of the present invention, together with various other objects, advantages, features and results thereof which will be evident to those skilled in the art in the light of this disclosure, may be attained with the exemplary embodiment of the clutch of the invention which is illustrated in the accompanying drawing and described in detail hereinafter.

Referring to the drawing:

Fig. 1 is a longitudinal view of a clutch of the invention with the parts thereof in their engaged positions under conditions of no wear;

Fig. 2 is a view similar to Fig. 1, but showing the parts of the clutch in their engaged positions after some wear has occurred;

Fig. 3 is a view similar to Figs. 1 and 2, but showing the parts of the clutch in their disengaged positions;

Fig. 4 is a transverse sectional view taken along the arrowed line 4—4 of Fig. 1; and Fig. 5 is a fragmentary transverse sectional view taken along the arrowed line 5—5 of Fig. 3 of the drawing.

In the particular construction illustrated, the clutch of the invention includes a continuously-operating driving member 10 carrying a pulley 12 around which is trained a V-belt 14. The latter may, for example, also be trained around a drive pulley on a marine engine, not shown. The clutch also includes a driven member 16 which is shown as taking the form of a hub 18 adapted to be fixed on a shaft 20 by means of a set screw 22. The shaft 20 may, for example, be the shaft of a bilge pump, not shown, which must be operated periodically to pump accumulations of water from the bilge of a boat, not shown, in which the pump is installed. Thus, the clutch of the invention may be engaged to connect the bilge pump to the engine of the boat when it is desired to pump out the bilge, and may be disengaged to disconnect the pump from the engine upon completion of the pumping operation. It will be understood, of course, that the foregoing is merely illustrative of one possible use of the clutch of the invention, it being susceptible of universal application.

The driving member 10 is rotatably mounted on the hub 18 of the driven member 16 by means of a ball bearing 23, and includes a driving clutch element 24, the latter having a frusto-conical clutching surface 26 in the particular construction illustrated. The driven member 16 includes a driven clutch element 28 having a frusto-conical clutching surface 30 complementary to and engageable with the clutching surface 26. The driven clutch element 28 is movable axially of the hub 18 into out of engagement with the driving clutch element 24 and is rotatable with the hub 18, a splined connection 32, or the equivalent, being provided between the driven clutch element 28 and the hub 18 for this purpose.

The clutch includes an annular, conical spring means 34 capable of snapping over center between relatively inverted, clutch-engaging and clutch-disengaging positions through an intermediate, on-center position for biasing the axially movable or driven clutch element 28 into engagement with the driving clutch element 24 when this spring means is in its clutch-engaging position and for biasing the driven clutch element 28 out of engagement with driving clutch element 24 when the spring means is in its clutch-disengaging position, the spring means 34 commonly being referred to as a Belleville spring or washer. As is well known, if a spring of this type is snapped from one of its relatively inverted positions to the other through its on-center position, it will remain in the relatively inverted position into which it has been snapped until such time as it is snapped back into the first relatively inverted position by an actuating force applied thereto.

The inner periphery of the Belleville spring 34 engages a fulcrum means 36 carried by the hub 18 of the driven member 16. More accurately, the inner periphery of the Belleville spring is loosely disposed in an annular groove 38 in a nut-like fulcrum element 40 threaded on one end of the hub 18 so as to be movable axially thereof to shift the fulcrum of the Belleville spring axially, whereby the various parts of the clutch may be preset initially in their proper relative positions, or whereby the parts thereof may be reset into their proper relative positions to compensate for wear of the clutching surfaces 26 and 30, as will be discussed in more detail hereinafter.

The Belleville spring 34 is adapted to loosely engage the movable clutch element 28 in an annular zone intermediate the inner and outer peripheries of the spring by seating on an annular rib 42 which is located adjacent the inner periphery of the Belleville spring 34, i. e., substantially closer to the inner periphery of the spring than to the outer periphery thereof, so that a relatively small actuating force applied to the outer periphery of the spring in a manner to be described applies a relatively large axial force to the movable clutch element 28 to insure positive engagement between the two clutch elements. In other words, this arrangement provides sufficient leverage that a large clutching force is developed with a small actuating force, which is an important feature.

Considering the manner in which axial actuating forces are applied to the outer periphery of the Belleville spring 34, the clutch of the invention includes an actuating means 44 loosely engaging the outer periphery of the spring. More specifically, the actuating means 44 includes a cover 46 which encloses one end of the clutch and which covers the spring, this cover carrying a central, axially extending, actuating knob 48 which may be rotatably mounted on the cover. The actuating means 44 also includes an annulus 50 which is attached to the perimeter of the cover 46 inwardly thereof, as by screws 52, and which co-operates with the cover to provide an annular groove 54 in which the outer periphery of the Belleville spring 34 is loosely disposed.

The actuating means 44, comprising the cover 46 and the annulus 50, is rotatable with and axially slidable relative to the driven clutch element 28, there being a keyed connection 56, or the equivalent, between the driven clutch element and the annulus for this purpose.

The clutch of the invention also includes means, comprising interengageable elements, i. e., flanges, 58 and 60 on the driven clutch element 28 and the annulus 50, respectively, for providing a lost-motion connection 62 between the driven clutch element and the actuating means 44. The flanges 58 and 60 engage as the actuating means 44 is moved axially in a direction to move the Belleville spring 34 from its clutch-engaging position toward its clutch-disengaging position and after the spring has been moved past its on-center position, whereby the energy liberated by the spring in snapping from its on-center position into its clutch-disengaging position is converted to an impact force applied to the movable clutch element to positively disengage it from the driving clutch element 24 as will be described in more detail hereinafter.

Considering the operation of the invention, Figs. 1 and 2 of the drawing illustrate the clutch with the parts thereof in their engaged positions, the Belleville spring 34 being concave to the left in each instance. Fig. 1 illustrates the engaged positions of the parts of the clutch with the fulcrum element preset to provide only a very slight leftward concavity for the Belleville spring 34. On the other hand, Fig. 2 illustrates the engaged positions of the parts of the clutch after some wear of the clutching surfaces 26 and 30 has occurred, the Belleville spring 34 thus being more concave to the left in Fig. 2 than in Fig. 1. As will be apparent, the fulcrum element 40 may be adjusted axially of the hub 18 to provide the Belleville spring 34 with any desired degree of concavity.

When the clutch is engaged so that the Belleville spring 34 is concave to the left as viewed in Figs. 1 and 2 of the drawing, it acts on the annular rib 42 of the driven clutch element 28 to bias this clutch element into torque-transmitting engagement with the driving clutch element 24. At the same time, the Belleville spring 34 acts on the actuating means 44 to constrain it against movement, thereby preventing rattling and wear due thereto.

The clutch of the invention is shown disengaged in Fig. 3 of the drawing, the Belleville spring 34 here being concave to the right, which is its clutch-disengaging position. Under these conditions, the spring 34 applies a rightward force to the actuating means 44, which is transmitted to the driven clutch element 28 by the flanges 58 and 60 to hold the driven clutch element 28 out of engagement with driving clutch element 24. At the same time, the Belleville spring 34 is seated on the annular rib 42 on the driven clutch element 28, thereby constraining the various parts against relative movement to prevent rattling and wear due thereto.

The foregoing discussion has been concerned primarily with a consideration of the static conditions obtaining when the clutch is engaged and disengaged. Considering now the dynamic conditions obtaining as the clutch is engaged or disengaged, it will be assumed that the parts of the clutch are to be moved from the engaged positions of Fig. 2, for example, to the disengaged positions of Fig. 3. To accomplish this, a pull force, i. e., a force to the right, is applied to the knob 48 to displace the actuating means 44 to the right. This causes the Belleville spring 34 to be displaced about its inner periphery from its clutch-engaging position through its on-center position toward its clutch-disengaging position, the latter being shown in Fig. 3. As the Belleville spring 34 is inverted in this manner, it disengages the annular rib 42 and, after the spring moves through its on-center position, the lost-motion connection 62 is taken up, i. e., the flange 60 on the annulus 50 engages the flange 58 on the driven clutch element 28. As the Belleville spring 34 moves over center, it starts to snap into its clutch-disengaging position, thereby liberating considerable energy. When the flanges 58 and 60 engage, this energy is converted into an impact force applied to the driven clutch element 28 which positively drives this clutch element out of torque-transmitting engagement with the driving clutch element 24 to provide clean disengagement of these elements, which is an important feature of the invention since it prevents sticking of the driven clutch element 28 to the driving clutch element 24.

Considering engagement of the clutch, a push force, i. e., a leftward force, is applied to the knob 48 to move the spring from its clutch-disengaging position through its center position toward its clutch-engaging position. As soon as the Belleville spring is moved past its center position, it automatically continues toward its clutch-engaging position to move the driven clutch element 28 into torque-transmitting engagement with the driving clutch element 24.

Since the distance between the annular rib 42 on the driven clutch element 28 and the fulcrumed inner periphery of the Belleville spring 34 is small as compared to the distance between the outer periphery of the spring and the fulcrumed inner periphery thereof, it will be apparent that small actuating forces applied to the knob 48 result in the application of large forces to the clutch element 28. This leverage permits the development of large clutch-engaging forces with small actuating forces which is an important feature.

As previously mentioned, the Belleville spring 34 contacts the fulcrum element 40, the annular rib 42 and the actuating means 44 in both the engaged and disengaged positions of the clutch, the flanges 58 and 60 of the driven clutch element 28 and the actuating means 44 also being in contact in the disengaged position of the clutch parts. Thus, the Belleville spring 34 acts to keep these various parts taut and constrained against relative movement in both the engaged and disengaged positions of the parts, thereby preventing rattling and wear due thereto, which is an important feature.

The arrangement of parts hereinbefore described also provides desirable rigidity in the manner in which the actuating means 44 is carried by the Belleville spring 34 by disposing the outer periphery of the spring in the groove 54 formed by the cover 46 and the annulus 50, which tends to properly align the actuating means and to prevent lateral movement thereof. Further constraint against lateral movement of the actuating means 44 is provided by engagement of the inner periphery of the flange 60 on the annulus 50 with the outer periphery of the driven clutch element 28 adjacent the flange 58, and by engagement of the outer periphery of the flange 58 on the driven clutch element with the inner periphery of the annulus 50 adjacent the flange 60 thereon. The diameters of these elements are so related as to provide a relatively close, sliding fit, thereby providing lateral constraint for the actuating means 44, which is an important feature.

Since the Belleville spring 34 is merely loosely disposed in the annular groove 38 in the fulcrum element 40 and is merely loosely disposed in the annular groove 54 formed between the cover 46 and the annulus 50, and merely seats on the annular rib 42 on the driven clutch element 28, it will be apparent that assembly of these parts is greatly facilitated, which is another important feature.

Another important feature resides in keying the actuating means 44 to the driven clutch element 28 by means of the connection 56, thereby causing the actuating means 44, the driven clutch element 28, the hub 18, the Belleville spring 34 and the nut 40 to rotate as a unit upon engagement of the driven clutch element 28 with the driving clutch element 24. Thus, there is no relative rotation between the components 18, 28, 34, 40 and 44, thereby eliminating the wear which would otherwise result from such relative rotation, eliminating the erratic operation of the Belleville spring 34 which might result therefrom, and eliminating any tendency of the nut 40 to move axially of the hub and change the spring action.

Although I have disclosed an exemplary embodiment of my invention herein for purposes of illustration, it will be understood that various changes, modifications and substitutions may be incorporated therein without departing from the spirit of the invention as defined by the claims which follow:

I claim:

1. In a clutch, the combination of: driving and driven members rotatable about a common axis and respectively including driving and driven clutch elements, one of said clutch elements being movable axially relative to the corresponding one of said members into and out of torque-transmitting engagement with the other of said clutch elements; annular, conical spring means capable of snapping over center between relatively inverted, clutch-engaging and clutch-disengaging positions through an intermediate, on-center position and engageable with said movable clutch element for biasing said movable clutch element into engagement with said other clutch element when said spring means is in said clutch-engaging position and for biasing said movable clutch element out of engagement with said other clutch element when said spring means is in said clutch-disengaging position; fulcrum means engaging said spring means; axially movable actuating means engaging said spring means for flexing said spring means between said clutch-engaging and clutch-disengaging positions about said fulcrum means, said actuating means and said movable clutch element being axially slidable relative to each other; and means, including interengageable elements on said actuating means and said movable clutch element, providing a lost-motion connection between said actuating means and said movable clutch element, said interengageable elements engaging as said actuating means is moved axially in a direction to move said spring means from said clutch-engaging position toward said clutch-disengaging position and after said spring means has been moved past said on-center position, whereby the energy liberated by said spring means in snapping from said on-center position into said clutch-disengaging position is utilized to move said movable clutch element axially out of torque-transmitting engagement with said other clutch element.

2. In a clutch, the combination of: driving and driven members rotatable about a common axis and respectively including driving and driven clutch elements, one of said clutch elements being movable axially relative to the corresponding one of said members into and out of torque-transmitting engagement with the other of said clutch elements; annular, conical spring means capable of snapping over center between relatively inverted clutch-engaging and clutch-disengaging positions through an intermediate, on-center position and engageable with said movable clutch element in an annular zone intermediate the inner and outer peripheries of said spring means for biasing said movable clutch element into engagement with said other clutch element when said spring means is in said clutch-engaging position and for biasing said movable clutch element out of engagement with said other clutch element when said spring means is in said clutch-disengaging position; fulcrum means engaging said inner periphery of said spring means; axially movable actuating means engaging said outer periphery of said spring means for flexing said spring means between said clutch-engaging and clutch-disengaging positions about said fulcrum means, said actuating means and said movable clutch element being axially slidable relative to each other; and means, including interengageable elements on said actuating means and said movable clutch element, providing a lost-motion connection between said actuating means and said movable clutch element, said interengageable elements engaging as said actuating means is moved axially in a direction to move said spring means from said clutch-engaging position toward said clutch-disengaging position and after said spring means has been moved past said on-center position, whereby the energy liberated by said spring means in snapping from said on-center position into said clutch-disengaging position is utilized to move said movable clutch element axially out of torque-transmitting engagement with said other clutch element.

3. In a clutch, the combination of: driving and driven members rotatable about a common axis and respectively including driving and driven clutch elements, one of said clutch elements being movable axially relative to the corresponding one of said members into and out of torque-transmitting engagement with the other of said clutch elements; annular, conical spring means capable of snapping over center between relatively inverted, clutch-engaging and clutch-disengaging positions through an intermediate, on-center position and engageable with said movable clutch element in an annular zone intermediate the inner and outer peripheries of, and adjacent said inner periphery of, said spring means for biasing said movable clutch element into engagement with said other clutch element when said spring means is in said clutch-engaging position and for biasing said movable clutch element out of engagement with said other clutch element when said spring means is in said clutch-disengaging position; fulcrum means engaging said inner periphery of said spring means; axially movable actuating means engaging said outer periphery of and carried by said spring means for flexing said spring means between said clutch-engaging and clutch-disengaging positions about said fulcrum means, said actuating means and said movable clutch element being axially slidable relative to each other; and means, including interengageable elements on said actuating means and said movable clutch element, providing a lost-motion connection between said actuating means and said movable clutch element, said interengageable elements engaging as said actuating means is moved axially in a direction to move said spring means from said clutch-engaging position toward said clutch-disengaging position and after said spring means has been moved past said on-center position, whereby the energy liberated by said spring means in snapping from said on-center position into said clutch-disengaging position is utilized to move said movable clutch element axially out of torque-transmitting engagement with said other clutch element.

4. In a clutch, the combination of: driving and driven members rotatable about a common axis and respectively including driving and driven clutch elements, one of said clutch elements being movable axially relative to the corresponding one of said members into and out of torque-transmitting engagement with the other of said clutch elements; annular, conical spring means capable of snapping over center between relatively inverted, clutch-engaging and clutch-disengaging positions through an intermediate, on-center position and engageable with said movable clutch element in annular zone intermediate the inner and outer peripheries of, and adjacent said inner periphery of, said spring means for biasing said movable clutch element into engagement with said other clutch element when said spring means is in said clutch-engaging position and for biasing said movable clutch element out of engagement with said other clutch element when said spring means is in said clutch-disengaging position; fulcrum means engaging said inner periphery of said spring means and including a fulcrum element threadedly mounted on said one member for movement axially thereof to adjust the fulcrum of said spring means axially; axially movable actuating means engaging said outer periphery of and carried by said spring means for flexing said spring means between said clutch-engaging and clutch-disengaging positions about said fulcrum, said actuating means and said movable clutch element being axially slidable relative to each other; and means, including interengageable elements on said actuating means and said movable clutch element, providing a lost-motion connection between said actuating means and said movable clutch element, said interengageable elements engaging as said actuating means is moved axially in a direction to move said spring means from said clutch-engaging position toward said clutch-disengaging position and after said spring means has been moved past said on-center position, whereby the energy liberated by said spring means in snapping from said on-center position into said clutch-disengaging position is utilized to move said movable clutch element axially out of torque-transmitting engagement with said other clutch element.

5. In a clutch, the combination of: driving and driven members rotatable about a common axis and respectively including driving and driven clutch elements, one of said clutch elements being movable axially relative to the corresponding one of said members into and out of torque-transmitting engagement with the other of said clutch elements; annular, conical spring means capable of snapping over center between relatively inverted, clutch-engaging and clutch-disengaging positions through an intermediate, on-center position and loosely engageable with said movable clutch element in an annular zone intermediate the inner and outer peripheries of, and adjacent said inner periphery of, said spring means for biasing said movable clutch element into engagement with said other clutch element when said spring means is in said clutch-engaging position and for biasing said movable clutch element out of engagement with said other clutch element when said spring means is in said clutch-disengaging position; fulcrum means loosely engaging said inner periphery of said spring means; axially movable actuating means loosely engaging said outer periphery of and carried by said spring means for flexing said spring means between said clutch-engaging and clutch-disengaging positions about said fulcrum means, said actuating means and said movable clutch element being axially slidable relative to each other; and means, including interengageable elements on said actuating means and said movable clutch element, providing a lost-motion connection between said actuating means and said movable clutch element, said interengageable elements engaging as said actuating means is moved axially in a direction to move said spring means from said clutch-engaging position toward said clutch-disengaging position and after said spring means has been moved past said on-center position, whereby the energy liberated by said spring means in snapping from said on-center position into said clutch-disengaging position is utilized to move said movable clutch element axially out of torque-transmitting engagement with said other clutch element.

6. In a clutch, the combination of: driving and driven members rotatable about a common axis and respectively including driving and driven clutch elements, one of said clutch elements being movable axially relative to the corresponding one of said members into and out of torque-transmitting engagement with the other of said clutch elements; annular, conical spring means capable of snapping over center between relatively inverted, clutch-engaging and clutch-disengaging positions through an intermediate, on-center position and engageable with said movable clutch element for biasing said movable clutch element into engagement with said other clutch element when said spring means is in said clutch-engaging position and for biasing said movable clutch element out of engagement with said other clutch element when said spring means is in said clutch disengaging position; fulcrum means on said one member and engaging said spring means; axially movable actuating means, movable in opposite, clutch-engaging and clutch-disengaging directions and engaging said spring means, for flexing said spring means between said clutch-engaging and clutch-disengaging positions about said fulcrum means; and means providing a connection between said actuating means and said movable clutch element for communicating movement of said actuating means in said clutch-disengaging direction to said movable clutch element.

7. In a clutch, the combination of: driving and driven members rotatable about a common axis and respectively including driving and driven clutch elements, one of said clutch elements being movable axially relative to the corresponding one of said members into and out of torque-transmitting engagement with the other of said clutch elements; annular, conical spring means capable of snapping over center between relatively inverted, clutch-engaging and clutch-disengaging positions through an intermediate, on-center position and engageable with said movable clutch element in an annular zone intermediate the inner and outer peripheries of, and adjacent said inner periphery of, said spring means for biasing said movable clutch element into engagement with said other clutch element when said spring means is in said clutch-engaging position and for biasing said movable clutch element out of engagement with said other clutch element when said spring means is in said clutch-disengaging position; fulcrum means on said one member and engaging said inner periphery of said spring means; axially movable actuating means, movable in opposite, clutch-engaging and clutch-disengaging directions and engaging said outer periphery of said spring means, for flexing said spring means between said clutch-engaging and clutch-disengaging positions about said fulcrum means; and means providing a lost-motion connection between said actuating means and said movable clutch element for communicating movement of said actuating means in said clutch-disengaging direction to said movable clutch element.

8. In a clutch, the combination of: driving and driven members rotatable about a common axis and respectively including driving and driven clutch elements, one of said clutch elements being movable axially relative to the corresponding one of said members into and out of torque-transmitting engagement with the other of said clutch elements; annular, conical spring means capable of snapping over center between relatively inverted, clutch-engaging and clutch-disengaging positions through an intermediate, on-center position and engageable with said movable clutch element in an annular zone intermediate the inner and outer peripheries of, and adjacent said inner periphery of, said spring means for biasing said movable clutch element into engagement with said other clutch element when said spring means is in said clutch-engaging position and for biasing said movable clutch element out of engagement with said other clutch element when said spring means is in said clutch-disengaging position; fulcrum means engaging said inner periphery of said spring means and including a fulcrum element threadedly mounted on said one member for movement axially thereof to adjust the fulcrum of said spring means axially; axially movable actuating means, movable in opposite, clutch-engaging and clutch-disengaging directions and engaging said outer periphery of said spring means, for flexing said spring means between said clutch-engaging and clutch-disengaging positions about said fulcrum; and means providing a lost-motion, torque-transmitting connection between said actuating means and said movable clutch element for communicating movement of said actuating means in said clutch-disengaging direction to said movable clutch element.

9. In a clutch, the combination of: driving and driven members rotatable about a common axis and respectively including driving and driven clutch elements, one of said clutch elements being movable axially relative to the corresponding one of said members into and out of torque-transmitting engagement with the other of said clutch elements; annular, conical spring means capable of snapping over center between relatively inverted, clutch-engaging and clutch-disengaging positions through an intermediate, on-center position and engageable with said movable clutch element in an annular zone intermediate the inner and outer peripheries of, and adjacent said inner periphery of, said spring means for biasing said movable clutch element into engagement with said other clutch element when said spring means is in said clutch-engaging position and for biasing said movable clutch element out of engagement with said other clutch element when said spring means is in said clutch-disengaging position; fulcrum means engaging said inner periphery of said spring means; axially movable actuating means engaging said outer periphery of and carried by said spring means for flexing said spring means between said clutch-engaging and clutch-disengaging positions about said fulcrum means, said actuating means and said movable clutch element being axially slidable relative to each other, and said actuating means including a cover enclosing said spring means and provided with a knob thereon; and means, including interengageable elements on said actuating means and said movable clutch element, providing a lost-motion connection between said actuating means and said movable clutch element, said interengageable elements engaging as said actuating means is moved axially in a direction to move said spring means from said clutch-engaging position toward said clutch-disengaging position and after said spring means has been moved past said on-center position, whereby the energy liberated by said spring means in snapping from said on-center position into said clutch-disengaging position is utilized to move said movable clutch element axially out of torque-transmitting engagement with said other clutch element.

10. A clutch according to claim 3 including means keying said actuating means and said movable clutch element against relative rotation.

11. In a clutch, the combination of: driving and driven members rotatable about a common axis and respectively including driving and driven clutch elements, one of said clutch elements being movable axially relative to the corresponding one of said members into and out of torque-transmitting engagement with the other of said clutch elements; annular, conical spring means capable of snapping over center between relatively inverted, clutch-engaging and clutch-disengaging positions through an intermediate, on-center position and engageable with said movable clutch element in an annular zone intermediate the inner and outer peripheries of, said spring means for biasing said movable clutch element into engagement with said other clutch element when said spring means is in said clutch-engaging position and for biasing said movable clutch element out of engagement with said other clutch element when said spring means is in said clutch-disengaging position; fulcrum means on said one member and engaging said inner periphery of said spring means; and axially movable actuating means engaging said outer periphery of said spring means for flexing said spring means between said clutch-engaging and clutch-disengaging positions about said fulcrum means, said actuating means including a cover which encloses said spring means and which at least partially encloses said movable clutch element.

References Cited in the file of this patent

UNITED STATES PATENTS

| | | |
|---|---|---|
| 2,399,886 | Odevseff | May 7, 1946 |
| 2,630,897 | Porter | Mar. 10, 1953 |